Figure 1:
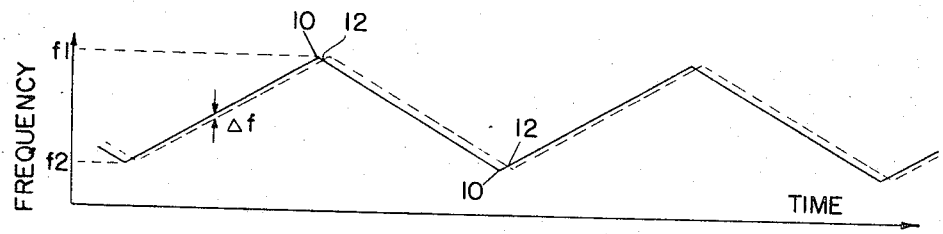

Sept. 5, 1967 D. BLITZ 3,340,529
FM ALTIMETER WITH REDUCED STEP ERROR
Filed June 11, 1963 3 Sheets-Sheet 1

INVENTOR.
DANIEL BLITZ
BY
ATTORNEY

Sept. 5, 1967    D. BLITZ    3,340,529
FM ALTIMETER WITH REDUCED STEP ERROR
Filed June 11, 1963    3 Sheets-Sheet 2

INVENTOR.
DANIEL BLITZ
BY
ATTORNEY

INVENTOR.
DANIEL BLITZ
ATTORNEY

United States Patent Office 3,340,529
Patented Sept. 5, 1967

3,340,529
FM ALTIMETER WITH REDUCED STEP ERROR
Daniel Blitz, Boston, Mass., assignor to Sanders Associates, Inc., Nashua, N.H., a corporation of Delaware
Filed June 11, 1963, Ser. No. 286,996
11 Claims. (Cl. 343—14)

This invention relates to an improved FM radio ranging system and more particularly, to an FM altimeter. In an altimeter of this type, the transmitted and received signals are combined in a mixer whose output frequency is indicative of altitude, and the invention is specifically related to nonlinear variation of the relative phase of the two inputs to the mixer. The nonlinear phase variation substantially eliminates the step error previously encountered in FM altimeters at certain vertical velocities.

While the invention is discussed with specific reference to an aircraft altimeter, its application to other ranging devices will be readily apparent.

An FM altimeter makes use of a transmitter whose frequency is periodically swept back and forth. The output of the transmitter is directed from the vehicle toward the earth's surface, and the reflected signal is applied to one input of a mixer. The other input to the mixer is obtained directly from the transmitter. The frequencies at the two mixer inputs differ by the amount of the change in frequency of the transmitter during the time it takes for the transmitted signal to traverse the path to the earth and return. Therefore, this frequency difference which appears at the output of the mixer, i.e., the beat frequency, depends on the altitude of the altimeter.

The output frequency of the mixer is ordinarily determined by means of a counter, whose output signal is a function of the number of beat frequency cycles during each sweep of the transmitter frequency. Since the counter can at best indicate only integral numbers of cycles, it might seem that there can be a change in indicated altitude only when the actual altitude has changed by an amount corresponding to one cycle of beat frequency. That is, the indicated altitude changes in steps corresponding to discrete increments of actual altitude. As a matter of fact, the resulting error, which is called "step error," can have an even worse effect than this. As the actual altitude changes in a given direction within a step, the counter output shifts up and down a number of times by one cycle, thus introducing steps more frequently than otherwise might be expected and indicating altitudes above and below the actual altitude. The manner in which this occurs is discussed below.

One approach is to the elimnation of step error is to continuously vary the phase of one of the inputs of the mixer in the receiver. This was thought to take care of the problem, but it has been found that the error is still encountered in some cases. For example, an airplane flying over smooth terrain is still subject to step error when it has any one of a number of certain vertical velocities. These conditions may prevail when the airplane is descending to land at an airport, just when the accuracy of an altimeter is often most important. Another application where step error is particularly troublesome is in hovering helicopters.

Accordingly, a principal object of my invention is to provide an FM ranging system in which step error is substantially eliminated under essentially all conditions. A more specific object is to provide an FM altimeter which is susbtantially free of step error at all vertical velocities.

Another object of the invention is to provide an altimeter of the above type which is reliable in operation.

Other objects of the invention will in part be obvious and will in part appear hereinafter.

The invention accordingly comprises the features of construction, combinations of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is a graphical illustration of the variation of the transmitted and received frequencies of an FM altimeter as a function of time.

Figure 2:
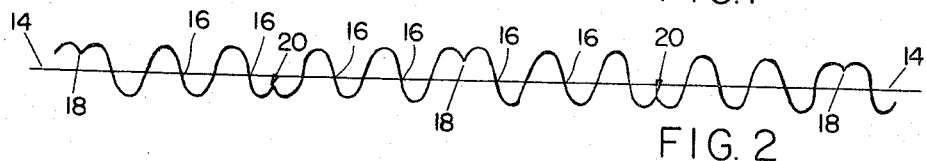
Figure 3:
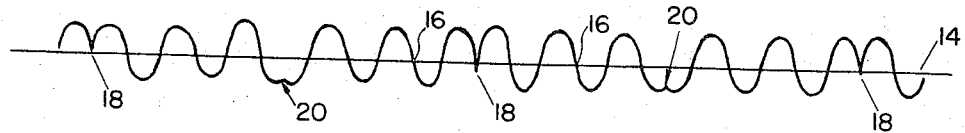
Figure 4:
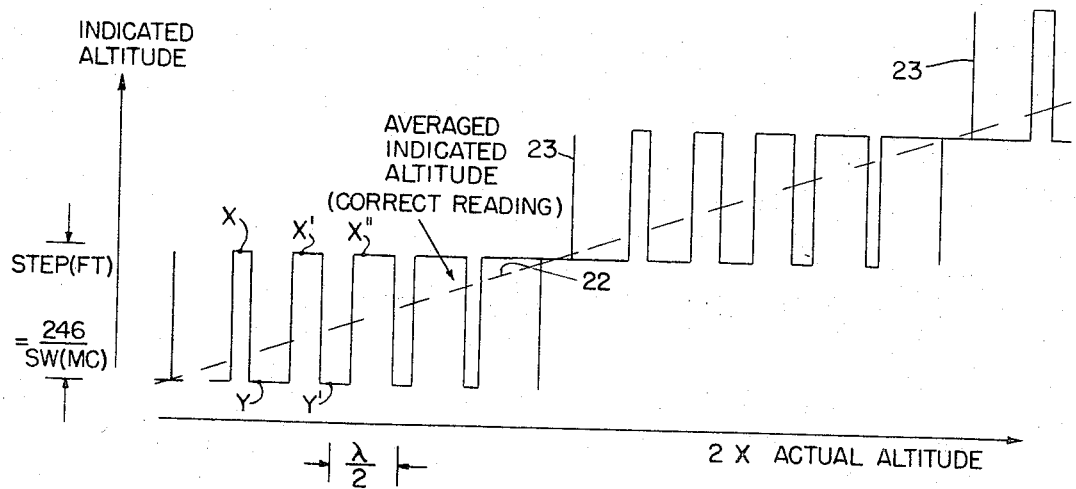
Figure 5:
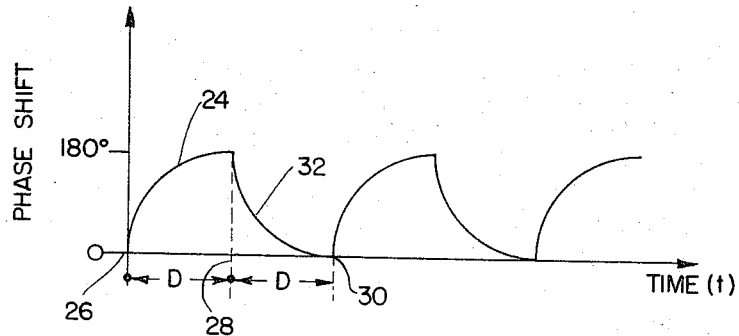
Figure 6:
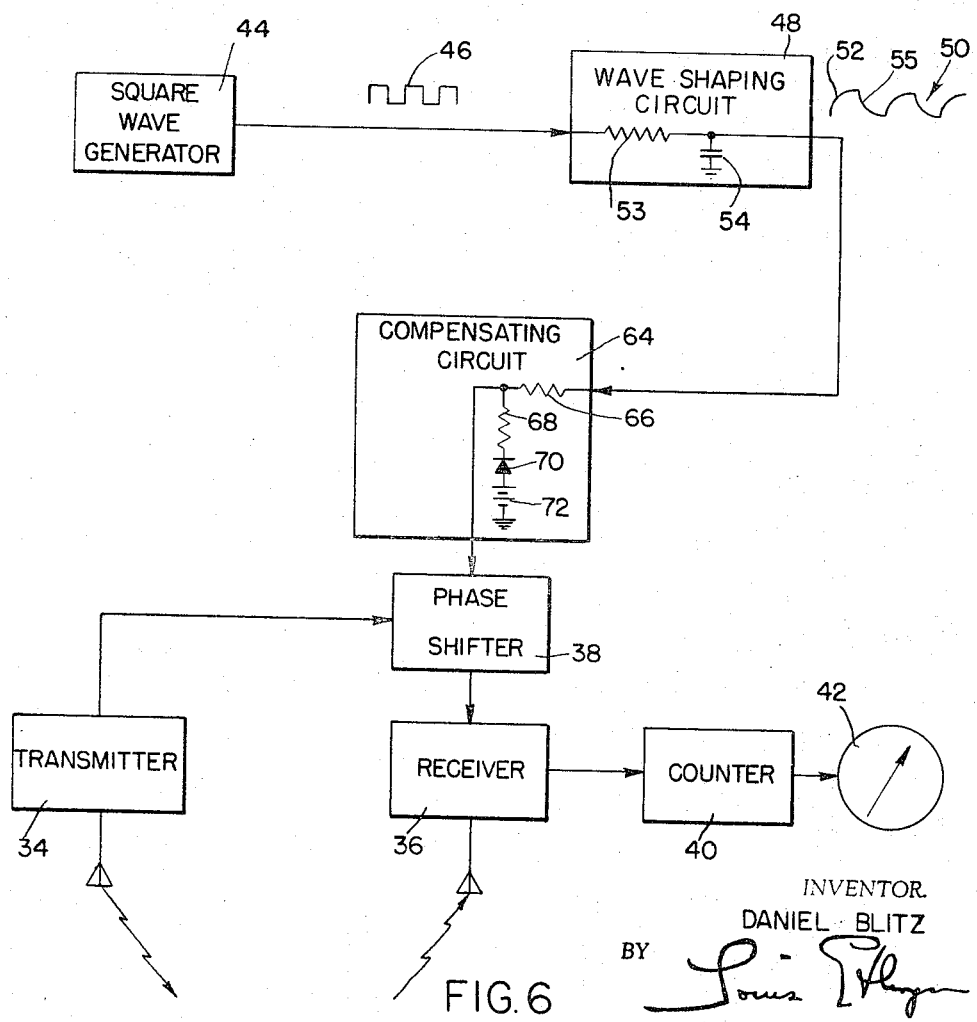
Figure 7:
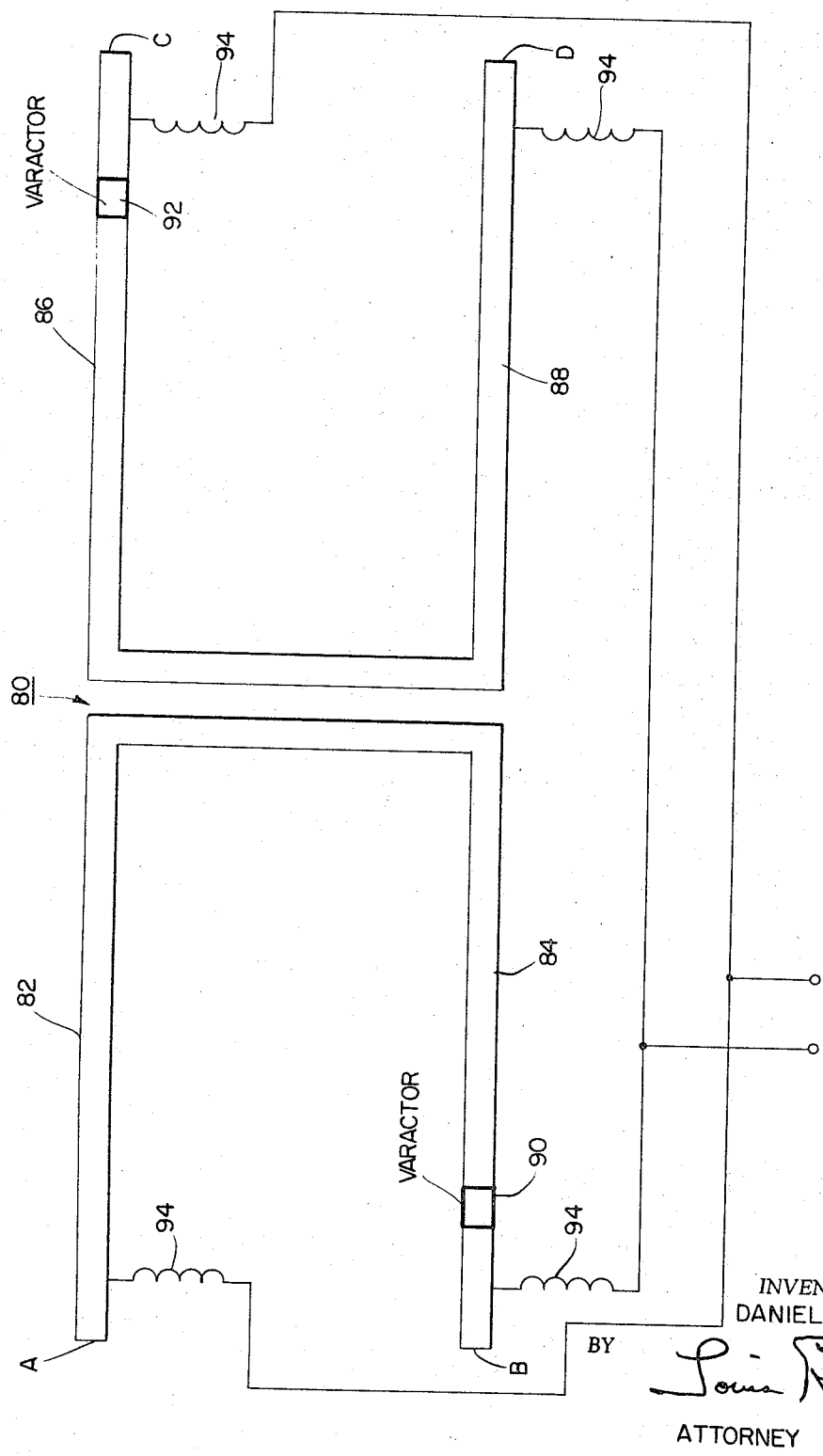

FIG. 2 shows the wave form the difference frequency obtained by mixing the transmitted and received signals at a given altitude, FIG. 3 shows the wave form at the difference frequency corresponding to an altitude different from that of FIG. 2, FIG. 4 illustrates the indicated altitude as a function of actual altitude in an altimeter subject to step error, FIG. 5 shows a suitable wave form for the phase shift variation in an altimeter operating according to the present invention, and FIG. 6 is a schematic representation of an altimeter incorporating the invention, and FIG. 7 is a schematic representation of a phase shifter which may be used in the altimeter.

In general, the invention makes use of a phase shifter connected to vary the phase of the signal applied to one of the inputs of the mixer which combines the transmitted and received signals. The phase delay of the phase shifter is varied, preferably periodically, in a nonlinear manner as a function of time, in contradistinction to the linear variation actually used prior to my invention. Since the phase of the output signal of a mixer depends on the phases of the mixer input signals thereof, operation of the phase shifter results in a corresponding variation in the phase of the beat frequency signal. As described below, the sweeping back and forth of the phase of the beat frequency results in changes in the number of cycles counted by the frequency counter from one frequency sweep to the next. If the phase variation follows the criteria set forth below and the frequency count is averaged, the altitude indication is almost entirely free of error.

FIG. 1 shows how the transmitted and received frequencies of an FM altimeter vary as a function of time. The solid line represents the transmitted frequency, which is swept, usually linearly, between upper and lower frequencies $f_1$ and $f_2$. By the time the transmission at a given frequency has reached the earth and returned to the receiver in the vehicle, the transmitter frequency has shifted to a new value. Therefore, the received frequency, which is indicated by the dash line in FIG. 1, lags behind the transmitter frequency, and the amount of the lag depends on the altitude of the vehicle carrying the altimeter. More specifically, the difference in frequency, $\Delta f$, depends on (1) the length of time it takes for the signal leaving the transmitter to return to the receiver and (2) the rate at which the transmitter frequency varies with time. The former factor is linearly related to altitude, and therefore $\Delta f$, which may be obtained by beating the transmitted and received frequencies against each other, is an indication of altitude.

FIG. 2 shows the waveform of the signal at a given constant altitude. As shown therein, the waveform is sinusoidal throughout most of each sweep of the transmitter frequency. However, at each sweep reversal, as indicated for example at 10 in FIG. 1, the received frequency momentarily catches up with the transmitted frequency, as indicated at 12. At the corresponding point in FIG. 2, there is a phase reversal of the beat frequency signal.

Next, consider the manner in which a frequency counter determines the beat frequency. Specifically, it may register each crossing of a threshold voltage value indicated by the axis 14 of FIG. 2, i.e., once for each half cycle of the beat frequency pattern. Thus, the counter will register the crossings at 16. There is no detection of the phase reversal points 18 and 20.

A counter which, in effect, registers the crossings of the axis 14 per sweep of the transmitter frequency will, of course, register a new altitude when the beat frequency has changed by one-half cycle per frequency sweep. The change in actual altitude, $\Delta h$, resulting in an increment in the indicated altitude of the frequency counter can be derived as follows:

First let $n_s$ be the number of half cycles of beat frequency during a sweep of the radio frequency in one direction. It will be observed that, $$n_s = 2f_b T \quad (1)$$

where $f_b$ is the beat frequency, and
$T$ is the time required from a frequency sweep in one direction Also, $$f_b = \frac{2h}{c} \frac{df_o}{dt} \quad (2)$$

where $h$ is the height above the terrain,
$c$ is the velocity of propagation,
$f_o$ is the transmitter frequency, and
$t$ is time.

Therefore, the number of half-cycles per sweep is given by $$n_s = \frac{4h}{c} \frac{df_o}{dt} \cdot T = \frac{4h}{c} SW \quad (3)$$

where SW is the sweep width $$\frac{df_o}{dt} \cdot T$$

i.e., the vertical distance between the maxima and the minima of FIG. 1.

Thus, the height $h$ is given by, $$h = n_s \cdot \frac{c}{4SW} \quad (4)$$

Let $$h_1 = n_{s_1} \cdot \frac{c}{4SW}$$

and $$h_2 = (n_{s_1} + 1) \frac{c}{4SW}$$

Then, $$\Delta h = h_2 - h_1 = \frac{c}{4SW} \quad (5)$$

and $$\Delta h = \frac{246}{SW \text{ (mc)}} \text{ ft} \quad (5a)$$

Thus, the increment in indicated altitude is dependent only on sweep width; it is independent of transmitter frequency and the sweep repetition rate. Given a sweep width of 50 megacycles, the indicated altitude changes in 5-foot steps.

However, although the indicated altitude changes in fairly large increments, these increments occur more frequently than with the variations in actual altitude given by Equation 5. More specifically, in going from one altitude step to the next, the indicated altitude fluctuates up and down a number of times between the two steps. This is the result of phase changes in the received signal. Each time the actual altitude changes by one-quarter wavelength at the transmitted frequency, the phase of the received signal changes by 180° (corresponding to the one-half wavelength change in total transmission path). The phase of the beat frequency signal undergoes a similar change, corresponding essentially to an inversion of FIG. 2. In undergoing such a change, the phase passes through a range in which the phase reversal point 18 is below the axis 14, as shown in FIG. 3, and this adds to the count registered by the frequency counter. When the altitude has changed the rest of the quarter wavelength, the beat frequency pattern is essentially the mirror image of the waveform shown in FIG. 2. Thus, there is no longer a crossing of the axis 14 corresponding to the point 18, and this removes the extra cycle previously added to the beat frequency count.

FIG. 4 illustrates how the indicated altitude varies with actual altitude. The step variations stem from a combination of the two effects described above, i.e., the change in the number of beat frequency cycles per sweep of the transmitter frequency, and the inversion of the phase of the beat frequency for each altitude increment equal to a quarter wavelength of the transmitter frequency. It will be observed that the width of each phase-caused step within an increment of indicated altitude varies with actual altitude. In particular, the widths of the higher altitude portions increase as the high altitude end of the increment is approached, and the widths of the lower altitude portions increase as the lower altitude end of the increment is approached.

In fact, it has been pointed out that the average of the indicated altitudes, as shown by the dash line 22, is proportional to the true altitude. This average can be obtained with a good degree of accuracy by varying the phase of one of the inputs to the mixer by a total of 180° and thereby accomplishing approximately the same variation in indicated altitude as a quarter wavelength change in actual altitude. The average can be sensed, for example, by a meter having a time constant which is at least as long as the time during which the phase variation takes place. A system of this type was disclosed by R. C. Sanders, Jr., in U.S. Patent No. 2,222,587.

While a phase shifting system such as the one described in the above patent usually reduces step error to such an inconsequential amount that it can be considered eliminated, it has been found that there are certain conditions under which the error will be fully reintroduced. For example, if the vehicle changes altitude at such a rate that the rate of phase change of the reflected signal is equal to the rate of the internally introduced phase shift, the two effects can cancel each other. This results in elimination of the step error correction. Thus, if the phase shifting is done continuously in one direction for a substantial period of time and covers 180° during each 0.1 second period, there is a shift of 1800° per second. With a 1600 megacycle transmitter frequency, an aircraft changing altitude at about 1.5 feet per second can cause the same rate of phase shift, and thus, the artificially induced phase shift may be cancelled out, with a consequent reintroduction of step error.

A somewhat similar phenomenon stems from the Doppler effect caused by the vertical velocity of the aircraft. Assume a frequency sweep rate of 100 cycles per second and a carrier frequency of 1600 megacycles. Also assume a beat frequency counter which counts the axis crossings 16 in both directions i.e., both the positive and negative going axis crossings. In the absence of internally induced phase shift, there is a change in the beat frequency count when the vertical velocity has a critical value of about 30 feet per second. That is, the received frequency is altered by one-half cycle in one sweep direction, corresponding to a difference of one axis crossing in FIG. 2. When the velocity corresponds exactly to one-half cycle, the count is simultaneously increased by one during the frequency sweep in one direction and decreased by one during the other half of each frequency sweep cycle. Thus, over a full frequency sweep cycle, this error averages out to zero and it is not registered by an indicator having a sufficiently long time constant.

It will be apparent that the same effect occurs at critical velocities which are integral multiples of the first critical velocity.

On the other hand, there may well be an error of another nature. Speaking in terms of FIGS. 2 and 3, the occurrence of a critical velocity partially stabilizes the beat frequency pattern. At such velocity, the altitude of the aircraft changes by one quarter wavelengh (or integral multiple thereof) during each frequency modulation cycle. Thus, the distance from transmitter to receiver by way of ground reflection changes by an integral number of half wavelengths in this interval and the relative phase of the received signal with respect to the axis crossing is the same from the beginning of one modulation cycle to the next.

More specifically, assume at the beginning of one frequency sweep the phase reversal point 18 is counted as in FIG. 3. This point then occurs at the upper end of the upper end of the altitude step, for example, at the point X in FIG. 4. At the critical velocity the next reversal of the frequency sweep of the system, corresponding to a phase reversal point 20 in FIGS. 2 and 3, occurs when the altitude of the aircraft has changed sufficiently for a one-half wavelength change in the round trip distance. Thus, the next phase reversal occurs at a point X'. Similarly, the next succeeding phase reversal occurs at a point X" in FIG. 4. Inspection of FIG. 4 indicates that the phase reversals will in general continue to take place at the top portions of the graph, with exceptions sometimes found at the thinner upright portions or spikes, such as those indicated at 23.

Similarly, if a phase reversal occurs at one of the lower portions of the graph, as at the point Y, for example, successive phase reversals spaced apart by one-half wavelength will also occur along the lower portion.

It is at the phase reversal points that the greater or lesser counts corresponding to the top and bottom portions of the steps in FIG. 4 are registered. This will be apparent from a comparison of FIGS. 2 and 3. There is a beat frequency axis crossing at the phase reversal points 18 of FIG. 3, but not in FIG. 2. Thus, if the altimeter happens to begin with phase reversals along the upper surface in FIG. 4, when the vertical velocity reaches the critical value, it will register an additional beat frequency count and thereby indicate an altitude corresponding to the top envelope of FIG. 4. When averaged by the system, this provides an altitude indication greater than the true altitude indicated by the line 22. On the other hand, should the phase reversal points occur at the point Y and a succession of similar points along the bottom envelope of the graph, the indicated average altitude corresponds to a line below the line 22. In either case, there is a fixed error mounting to substantially one-half an altitude step or increment as defined in Equation 5a.

It should be noted that the same phenomenon occurs at velocities which are multiples of the lowest critical velocity discussed above.

At vertical velocities which differ substantially from the critical velocities under discussion, the phase reversal points alternately fairly often between the upper and lower envelopes of FIG. 4. The effect is similar to that of the phase shifter discussed above in that it provides an averaging effect resulting in an indicated altitude which closely approximates the true altitude represented by the line 22.

On the other hand, at vertical velocities close to the critical velocities, the phase reversals of the beat frequency signal are almost, but not quite, in synchronism with the phase caused steps of FIG. 4. As a result, the phase reversals occur along the upper envelope a number of times and then move to the lower envelope for the next succession of occurrences. Thus, the indicated altitude slowly alternates back and forth between the two envelopes. In other words, the indicated altitude, while undergoing a general increase and decrease, continually shifts up and down in a specie of step error as it alternates between readings above and below the actual altitude. Moreover, the electrical output of the altimeter contains a series of discontinuities which impede the operation of control equipment regulating various mechanisms according to the altitude of the aircraft.

This is a particularly serious problem when the electrical output is differentiated to provide rate information, since the noise due to discontinuities is effectively increased by differentiation. At frequencies substantially different from the critical velocities, these discontinuities occur at a sufficiently rapid rate, i.e., at high frequencies, that they can be filtered out. However, the discontinuities occurring at the lower critical velocities and velocities sufficiently close thereto will have an effective frequency so low that they cannot be filtered out without an inordinate increase in the response time of the system.

Since vertical velocity has the same effect as an internally generated continuous change of the relative phases of the transmitted and received signals, the internally generated phase shift adds to or substracts from the effective velocity. That is, it merely shifts the values of the critical velocities (in the above example, by 1.5 feet per second). Thus, in this cited example, there is a step error at velocities in one direction of 1.5, 31.5 feet per second, etc. The range of velocities about each critical velocity, in which step error occurs may be termed a "critical range." Similarly, for each vertical velocity there is a "critical range" of rates of phase change in which step error occurs.

If the phase shifter is swept back and forth instead of in one direction, e.g., with a triangular waveform comprising a 180° increase in phase for 0.5 second and then a 180° decrease in phase during the next 0.05 second, a critical velocity which corresponds to the phase shift during a period of increasing phase will not correspond to the phase shift during the period of which the phase decreases. Thus, the full step error will be present during half the phase sweep cycle and absent during the other half, with a resulting maximum step error of one-half the value obtained with a continuous phase shift in one direction for a substantial length of time. Operation of this nature can be readily obtained. For example, a varactor type phase modulator can be used, with a 10 c.p.s. triangular modulating voltage supplied to vary the capacitance of the varactor.

The present invention achieves a substantial reduction in step error by varying the rate of phase shift so that the artificially induced phase shift will never correspond to the rate of change of vehicle altitude for any appreciable length of time. More specifically if the phase is varied at a substantially monlinear rate with respect to time, the phase variation will not closely correspond to any constant rate of change of altitude. Moreover, it is extremely unlikely that the vertical component of vehicle velocity will change at a rate fitting this induced phase variation.

Thus, the phase shift may take the form shown in FIG. 5. In this figure, the curve 24 between the points 26 and 28 denotes a phase shift which varies nonlinearly with respect to time. That is, the slope $d\theta/dt$, varies continuously between the points 26 and 28. As pointed out above, it is this slope to which step error-causing rate of altitude change corresponds, and, therefore, for step error to be introduced, the slope of the phase shift curve 24 must correspond to velocities in a critical range for an appreciable length of time.

This requires, in general terms, a matching of the altitude variations of the vehicle to the curve 24 over a number of phase cycles, a most unlikely occurrence. Therefore, step error is effectively eliminated under all conditions during the interval D between the points 26 and 28, in which the phase shift increases by 180°.

Similarly, step error is essentially absent during the next interval D between the points 28 and 30 in which the phase shift is returned by 180° to 0°, as will be apparent from the curve 32 between these points.

Preferably, the slope $d\theta/dt$, varies at a substantial rate, i.e., $d^2\theta/dt^2$ has a large value, in order to minimize the interval during which the slope is in the critical range.

Elimination of step error in the above manner can introduce error of another type. As pointed out above, the reduction in step error provided by phase shifting results from averaging of the indicated altitudes corresponding to different phase shifts. From the curvature of the curve 24, it will be apparent that an average taken over the duration of this curve will be weighted in the direction of the altitude corresponding to a large value of phase shift, because the phase changes more slowly in this region, and consequently, the system is exposed to this altitude step, a disproportional amount of time. Therefore, the average will not directly indicate the altitude. This type of error can be eliminated by proper "matching" of the relative shapes of the curves 24 and 32, so that the weighting introduced by one curve compensates for the weighting introduced by the other curve.

More specifically, if, over the total time interval 2D covered by the curves 24 and 32, the total time spent at each increment of phase shift is constant for all phase shift angles, the indicated average altitude will closely approximate the true altitude. This criterion can be restated mathematically by, $$\left|\frac{d\theta}{dt}\right|\theta \text{ (curve 24)} + \left|\frac{d\theta}{dt}\right|\theta \text{ (curve 32)} = \text{constant} \quad (6)$$

where, $$\left|\frac{d\theta}{dt}\right|\theta \text{ (curve 24)}$$

is the rate of phase change in the curve 24 at any phase angle $\theta$, and $$\left|\frac{d\theta}{dt}\right|\theta \text{ (curve 32)}$$

is the rate of phase change at the same angle $\theta$ in the curve 32.

Ways in which a waveform of this type can be achieved are discussed below.

It should be noted that the specific waveform of FIG. 5 is not the only one which can meet the requirement for accurate averaging. For example, if the phase changes continuously in one direction, the curvature can be concave downward for 360°, concave upward for the next 360°, and so on. Another alternative is to use a modified sawtooth waveform in which successive ramp portions of 180° phase change alternate between concave upward and concave downward shapes. Also, where the direction of phase change is reversed, the total swing may be either 180°, as shown or a multiple thereof.

With reference now to FIG. 6, an FM altimeter incorporating the present invention includes a transmitter 34 which transmits a signal toward the earth's surface and a receiver 36 which receives the reflected signal. An attenuated output from the transmitter 34 is also applied to the receiver by way of a variable phase shifter 38. The receiver 36 includes a mixer (not shown) which mixes the reflected transmitter signal and the signal from the phase shifter, as described above, to provide a beat frequency signal whose frequency is measured by a counter 40. The output of the counter 40 is registered by an indicator which may take the form of a meter 42 calibrated in terms of altitude. The over-all operation of the elements 34–42 is similar to that of prior FM altimeters.

The counter 40 may be of the type described in U.S. Patents Nos. 2,228,367 and 2,137,859. The time constant of the counter and meter circuit, i.e., the period over which the average number of axis crossings per second is taken, should be at least as long as a full cycle of phase sweep.

The phase shifter 38 is preferably an electronic phase shifter, although a variable mechanical phase shifter might well be used to practice our invention. The variable element may be a varactor, i.e., a p-n junction diode in which the junction capacitance varies according to the voltage across the junction. A varactor may be used to control phase in the same manner as any other type of variable capacitor.

FIG. 7 shows schematically a variable phase shifter which may be used in the altimeter. It includes a parallel-line directional coupler, generally indicated at 80, having a 3 db coupling ratio. The coupler 80 is preferably formed from the inner conductors of strip transmission lines, and the conductors shown in FIG. 7 are such conductors. The inner conductors are parallel to and spaced from a ground plane conductor, and preferably they are between a pair of ground plane conductors. A coupler of this type is shown on page 82 of "Handbook of Tri-Plate Components," published in 1956 by Sanders Associates, Inc. The ground plane conductors have been omitted from FIG. 7 for the sake of clarity.

The coupler 80 has four ports, A, B, C and D, at the ends of arms 82, 84, 86 and 88. The input from the transmitter 34 is fed to the port A and the output for the receiver 36 is taken from the port D. The arms 84 and 86 are preferably of the same length and varactors 90 and 92 are in series in these arms, spaced equidistantly from the ports B and C. The ports B and C provide open circuit terminations from the arms 84 and 86. The varactors may be controlled by applying control voltages through isolating chokes 94 connected for parallel control.

The power entering the port A is divided equally between the arms 84 and 86 by the coupler 80. It is then reflected from the varactors 90 and 92, as well as the ports B and C. Finally, the power again passes through the coupler and out along the arm 88 to the port D.

The phase delay undergone by power passing from port A to port D depends on the distance it travels along the arms 84 and 86 before being reflected. If the varactors 90 and 92 have low impedances, almost all the reflection takes place at the ports B and C, and phase delay is at a maximum. On the other hand, if the control voltage on the varactors is such as to maximize impedance, i.e., minimize capacitance, a large portion of the power is reflected from the varactors, and phase delay is at a minimum. Specifically, the net phase delay between input and output of the phase shifter is a resultant determined by (1) the distance between the varactors 90 and 92 and the ports B and C, and (2) the impedances of the varactors. Thus, by varying the control voltages on the varactors, the phase shift may also be varied continuously between its maximum and minimum values.

A ferrite device may also be used as the phase shifting element. Moreover, the phase shifter may alternatively be arranged to vary the phase of the other input to the receiver mixer. Thus, it may be connected between the transmitter 34 and its antenna or between the receiving antenna and the mixer in the receiver.

One way of varying the phase shift imparted by the shifter 38 in accordance with the present invention is shown in FIG. 6. A square wave generator 44 emits an output signal 46 which is passed through a wave shaping circuit 48. The output signal of the circuit 48 thus has a dual exponential waveform as indicated at 50.

The signal 50 is of the type shown in FIG. 5. That is, with the substitution of voltage for phase angle, it meets the criterion set forth in Equation 6. Thus, it is suitable for controlling a phase shifter operating according to the invention. This can be shown by considering the waveform 50. Assume that the square wave 46 of FIG. 6 alternates between values of 0 and E volts, with the output of the shaping circuit 48 having a minimum value $V_0$ and a maximum value $V_1$. The voltage $V_{52}$ along the rising portion 52 is given by $$V_{52} = V_0 + (E - V_0)(1 - exp) \quad (7)$$

where $exp = C - t/RC$,

R is the resistance of the resistor 53 in the circuit 48, and C is the capacitance of the capacitor 54.

The voltage $V_{55}$ along the descending portion 55 of the waveform 50 is given by $$V_{55} = V_1 - V_1(1 - exp) \quad (8)$$

Because of symmetry, we can substitute $$V_1 = E - V_0$$

$$V_{55} = E - V_0)exp \quad (9)$$

The sum of the magnitudes of the time derivatives corresponding to any given voltage in the portions 52 and 55 is given by $$\left|\frac{dV_{52}}{dt}\right| + \left|\frac{dV_{55}}{dt}\right| = \frac{1}{RC}(E - V_0)exp_{52} + \frac{1}{RC}(E - V_0)exp_{55} \quad (10)$$

Assume a voltage, M, is each of the waveform portions 52 and 55. Then substituting for $V_{52}$ in (7), $$1 - exp_{52} = \frac{M - V_0}{E - V_0}$$

and $$exp_{52} = \frac{E - M}{E - V_0} \quad (11)$$

Similarly, by substituting M for $V_{55}$ in (9), $$exp_{55} = \frac{M}{E - V_0} \quad (12)$$

Finally, substituting (11) and (12) in (10), $$\left|\frac{dV_{52}}{dt}\right|_M + \left|\frac{dV_{55}}{dt}\right|_M = \frac{1}{RC}(E - M + M) = \frac{E}{RC} = \text{constant} \quad (13)$$

Expression 13 is independent of the chosen voltage M, and therefore, it is in accord with Equation 6.

It is desirable that the portions of the exponential curves with the greatest curvature (corresponding to greatest rate of change of phase shift) be utilized, and the circuit parameters may readily be chosen to accomplish this.

The period of the signal 46 should differ substantially from the period of the frequency sweep of the transmitter 34, and preferably, it is considerably longer.

If the phase shifter 38 is a linear device, that is, if the phase shift imparted by it is a linear function of input voltages, the output of the wave shaping circuit 48 may be applied directly to the phase shifter. However, a varactor phase shifter of the type mentioned above has a nonlinear phase-control voltage relationship. As the control voltage is increased, the change in phase per unit of control voltage decreases. Accordingly, a compensating circuit 64, which is connected to the output of the circuit 48, is arranged to provide a greater response to higher input voltage than to lower voltage.

More specifically, the compensating circuit includes a series resistor 66 and a shunt branch comprising the series combination of a resistor 68 and a diode 70. A bias source, illustratively a battery 72, biases the diode 70 in the forward direction. Assuming positive voltages are passed through the circuit, as long as the incoming voltage is less than the voltage of the battery 72, the diode 70 conducts and the resistors 66 and 68 function as a voltage divider attenuating the input voltage.

However, when the input voltage is greater than the voltage of the battery 72, the diode 70 is reverse biased so that no current flows through the resistor 68. There is no longer any attenuation due to the latter resistor, and, thus, the attenuation in the compensating circuit is less for input voltages above the level of the battery 72 than for voltages below that level. This, in turn, compensates for the fact that the incremental phase shift in the phase shifter 38 is greater at low input voltages than at higher voltages.

The instantaneous voltage at the output of the compensator 64 should vary sufficiently to provide a 180° variation in the phase shift imparted by the phase shifter 38.

It will be appreciated that, with only a single change in response, the circuit 64 cannot exactly compensate for the characteristics of a phase shifter in which the response varies continuously as a function of input voltage. However, I have found that the compensation is sufficient to provide altimeter operation with a very small error. Specifically, operation with an error of less than one-half foot has been obtained. In any case, the compensating circuit can be given closer correspondence to the phase shifter characteristics by increasing the number of shunt branches, with each branch to cut off at a different input voltage.

It should be noted that, since the cause of step error is the reversal of the frequency sweep in the transmitter, the phase shift need only be applied in the region of frequency sweep reversal for step error to be corrected. More specificially, it may be limited to the period between the reversal of the transmitter sweep and the corresponding reversal of the sweep of the received frequency. However, for practical reasons, the phase shift is carried on throughout the frequency sweep.

Thus, I have described an improved FM altimeter in which step error has been virtually eliminated, with a corresponding increase in accuracy. The altimeter, in common with prior altimeters dealing with step error, uses a variable phase shifter to continuously vary the phase of one of the inputs to the receiver mixer. In accordance with my invention, the phase is varied nonlinearly with respect to time, at least during error-causing portions of each sweep of the transmitter frequency. That is, the rate of phase change is continuously varied. In order to maximize the accuracy of the system, I vary the phase in such manner that the total time, over the averaging period, during which the phase shifter is at each phase delay, is equal for the various phases. This virtually eliminates error arising from unequal weighting of the indicated altitude corresponding to different values of phase shift.

It will be noted that while the phase-versus-time function is preferably a smooth relationship, e.g., the curves 24 and 32, it may also take the form of a series of discrete, stepwise changes in phase. Assuming that these changes occur often enough, they approximate a smooth curve and thus constitute a "continuous" phase variation within the scope of the invention.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. In an FM ranging system of the type including a mixer developing a beat frequency signal corresponding to the difference between the transmitted and reflected signal frequencies, means for counting the cycles of the beat frequency at the output of said mixer, and a phase shifter connected to continuously vary the phase of one of the inputs to said mixer, the improvement in which said phase shifter includes means for substantially varying said phase at a varying rate to cause the total time spent at each increment of phase shift to be constant for all phase shift angles.

2. The combination defined in claim 1 in which said phase shifter varies said phase in such a manner that the average amount of time during which the output voltage of said phase shifter has any given phase angle is substantially equal to the average amount of time for any other phase angle.

3. The combination defined in claim 1 in which said phase shifter varies said phase cyclically by alternately increasing and decreasing the phase shift imparted to its output.

4. In an FM altimeter of the type including a mixer developing a beat frequency signal corresponding to the difference between the transmitted and reflected signal frequencies, and means for counting the cycles of the beat frequency at the output of said mixer, a variable phase shifter connected to control the phase of one of the inputs to said mixer and means for continuously varying the effective phase shift of said phase shifter, the improvement in which said phase varying means cyclically varies said phase so as to alternately increase and decrease it at a continuously varying rate, the sum of the absolute value of the rate of phase change at any phase during each period of increase in a cycle of phase variation and the absolute value of the rate of phase change at the corresponding phase during the period of decreasing phase in the same cycle having a constant value throughout said cycle.

5. An FM altimeter comprising, in combination, a frequency modulated transmitter, a receiver including a mixer for mixing the reflected and transmitted signals, means for counting the cycles of the beat frequency at the output of said mixer, phase varying means comprising a generator providing a cyclically varying third signal composed of two separate portions and having the characteristic, $|dX/dt|_{x_1}$ of the first one of said portions $+ |dX/dt|_{x_1}$ of the second one of said portions $=$ constant, where $|dX/dt|_{x_1}$ is the time derivative of the value of the portions of said third signal for any given value of said third signal, and $|dX/dt|$ varies with X, and a variable phase shifter connected to change the phase of one of the input signals of said mixer in accordance with said third signal.

6. The combination defined in claim 5 in which said generator includes a square wave generator and a wave shaping circuit connected to the output of said square wave generator, said third signal being the ouput of said shaping circuit, said shaping circuit providing an exponential response with decreasing slope when a step function is applied thereto.

7. The combination defined in claim 5 in which said phase varying means includes a varactor as a variable element, said phase varying means having a nonlinear relationship betwen phase shift and said third signal, said altimeter including a compensation circuit connected to modify said third signal to provide a fourth signal, said phase shifter changing said phase in response to said fourth signal, the relationship between said fourth signal and said third signal being such as to provide a linear relationship between said phase shift and said third signal.

8. In an FM altimeter of the type including a mixer developing a beat frequency signal corresponding to the difference between the transmitted and reflected signal frequencies, means for counting the cycles of the beat frequency at the output of said mixer, and a phase shifter electrically connected to said mixer to continuously vary the phase of one of the inputs thereto, the improvement in which said phase shifter is aranged to substantially vary said phase at a preselected non-sinusoidal varying rate.

9. An FM altimeter in accordance with claim 8, wherein said phase shifter varies said phase cyclically by alternately increasing and decreasing the phase shift imparted to its output.

10. An FM altimeter in accordance with claim 9 and including a generator providing a cyclically varying signal composed of two separate portions, the output of said generator being connected to said phase shifter to vary said phase cyclically.

11. An FM altimeter in accordance with claim 10, wherein said generator includes a square wave generator and a wave-shaping circuit connected to the output of said square wave generator, said shaping circuit providing an exponential response with decreasing slope when a step function is applied thereto.

References Cited

UNITED STATES PATENTS

| 3,019,430 | 1/1962 | Pederson et al. | 343—12 |
| 3,112,481 | 11/1963 | Goldberg | 343—14 |
| 3,150,367 | 9/1964 | Harrington | 343—14 |
| 3,197,705 | 7/1965 | DaMoude | 325—145 |

OTHER REFERENCES

Skolnik, "Introduction to Radar Systems," McGraw-Hill, New York, 1962, TK6575S5, pp. 96–99 relied on.

RODNEY D. BENNETT, *Primary Examiner.*

DAVID G. REDINBAUGH, *Examiner.*

B. V. SAFOUREK, J. P, MORRIS, *Assistant Examiners.*